Sept. 10, 1968 C. F. AULT 3,401,383

TRANSDUCER DISPLACEMENT DETECTOR

Filed Dec. 10, 1964

INVENTOR
C. F. AULT
BY D. E. Snedeker
ATTORNEY

United States Patent Office 3,401,383

Patented Sept. 10, 1968

3,401,383

TRANSDUCER DISPLACEMENT DETECTOR

Cyrus F. Ault, Lincroft, N.J., assignor to Bell Telephone Laboratories, Incorporated, New York, N.Y., a corporation of New York Filed Dec. 10, 1964, Ser. No. 417,391
12 Claims. (Cl. 340—174.1)

ABSTRACT OF THE DISCLOSURE

A change in the displacement between a transducer head and adjacent storage surface is detected by monitoring the breakdown voltage across the gap therebetween. A variable potential source increases the voltage across the gap between these elements periodically. A potential level change detector compares successive levels of breakdown voltage to detect a change in the displacement between transducer head and storage surface.

Figures 1, 2:
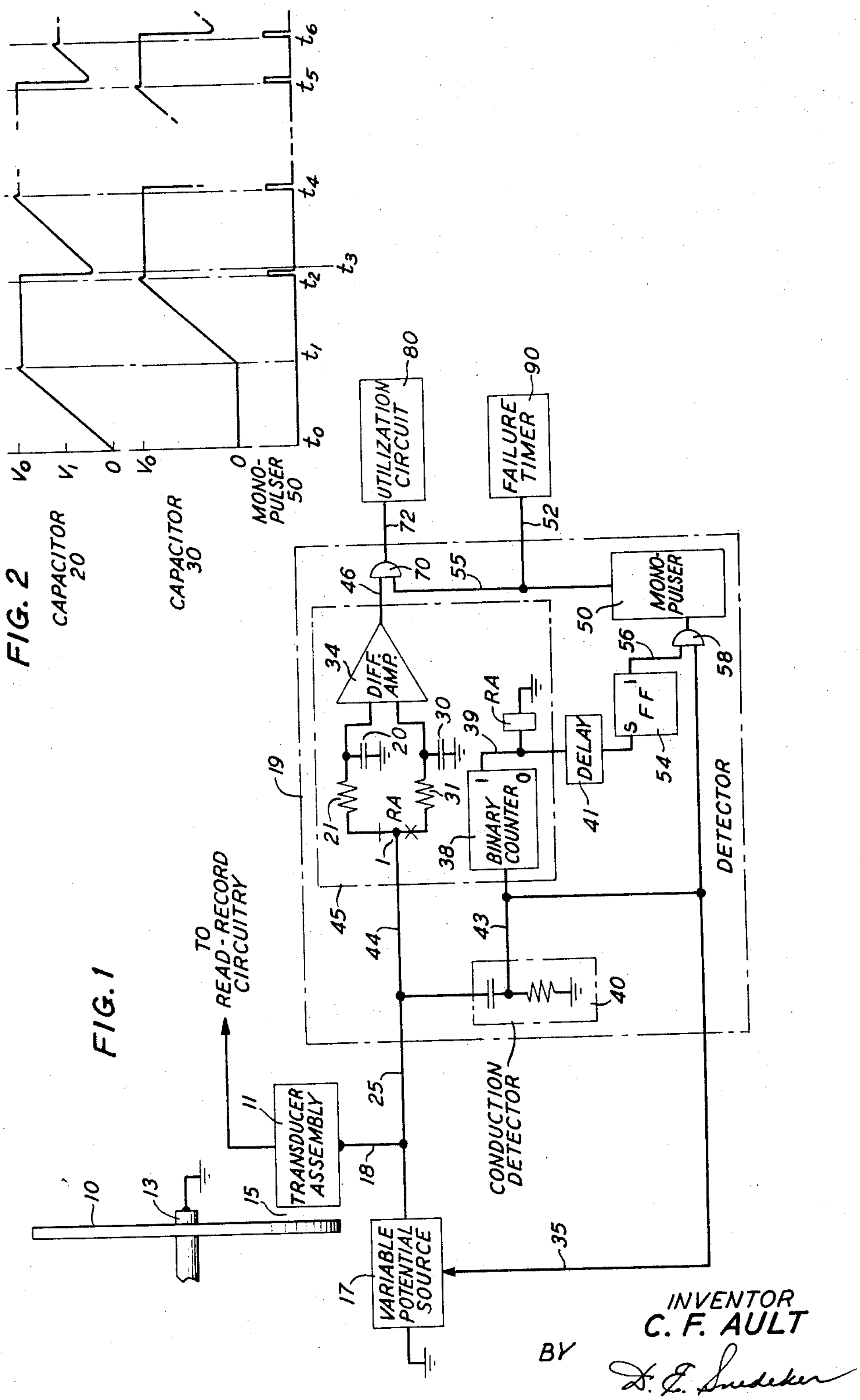

This invention relates to displacement detection arrangements and more particularly to a method and apparatus for detecting displacement of a transducer assembly from its predetermined position relative to a dynamic information storage medium.

In dynamic information storage systems the stored information is in continuous motion with respect to a fixed point in the system, such as a transducer assembly employed for read in and read out of the information. The transducer assembly and the storage medium may be stationary with respect to one another and the information in motion within or on the storage medium, as in the case of delay line storage; or, alternatively, the transducer assembly and the storage medium may be in relative motion with respect to each other and the information stationary within or on the storage medium, as in the case of magnetic drum or disc storage. The present invention is concerned primarily with the latter type of dynamic information storage system, especially with rotating magnetic drum and magnetic disc storage systems, and is described in connection with such a system in the illustrative embodiment herein. However, it will be apparent from the description herein that the present invention is not limited in its application to this type of system but rather may be employed advantageously for displacement detection purposes in numerous other applications.

The recording and reproduction of information in a magnetic drum or magnetic disc storage system is effected through magnetic coupling between the storage medium and a transducer assembly. The most efficient magnetic coupling is achieved when the storage medium and the transducer assembly are in actual physical contact with one another. However, contact recording and reproduction have been found to be impracticable in such systems due to the resulting abrasive damage both to the transducer assembly and to the storage medium, usually leading to failure of the system. Accordingly, a small clearance or air gap of predetermined width, the narrower the better, is provided between the storage medium and the transducer assembly. Typically, this air gap may be on the order of one mil or less.

Various arrangements have been employed in an attempt to provide accurate and uniform positioning of a transducer assembly adjacent a rotating storage medium with a minimum air gap therebetween. For example, a generally successful approach has been to float the transducer assembly on a fluid film of air generated by the rotation of the storage medium and drawn along with the medium by surface friction. This laminar flow of air tends to push the transducer assembly away from the surface of the rotating storage medium and is opposed by a biasing force from a spring or from external air pressure which urges the transducer assembly toward the surface of the storage medium. A balance between these forces is achieved to maintain the predetermined air gap spacing between the transducer assembly and the surface of the rotating storage medium. If, however, this balance is upset, such that the transducer assembly is urged into contact with the surface of the rotating storage medium, the aforementioned damage to or failure of the system may result. It is highly desirable, therefore, regardless of whether this or another positioning arrangement is employed, to be able to detect such contact immediately or, preferably, to detect imminent contact and to retract the transducer assembly before system damage or failure results.

It is accordingly a general object of this invention to provide a simple and economical method and arrangement for detecting displacement of a first object, such as a transducer assembly, from its predetermined position relative to a second object, such as a storage medium.

More particularly, it is an object of this invention to provide an arrangement for detecting movement of a transducer assembly from its predetermined position toward the surface of a rotating storage medium.

It is another object of this invention to provide a simple and economical arrangement which is responsive to displacement of a transducer assembly from its predetermined position toward or away from the surface of a moving storage medium for providing a control signal.

The above and other objects are attained in an illustrative embodiment of a transducer displacement detector, in accordance with the present invention, wherein the surface of the rotating storage medium and at least a portion of the transducer assembly adjacent the surface of the rotating medium are of conducting material connected in circuit with a source of potential and a conduction detector. The potential applied to the circuit is such that normally the circuit is open by virtue of the air gap of predetermined width between the transducer assembly and the rotating storage medium. If, however, the gap is sufficiently narrowed, such as when the transducer assembly moves toward and approaches the point of contacting the surface of the rotating medium, air in the gap is ionized by the circuit potential and conduction occurs. Responsive thereto, the conduction detector initiates suitable protective action before actual contact occurs between the transducer assembly and the storage medium. For example, the detector may sound an alarm and effect retraction of the transducer assembly to a safe distance from the surface of the storage medium.

In accordance with an aspect of the present invention, the source of potential in circuit with the transducer assembly and the surface of the storage medium is a variable potential source such as a sawtooth potential generator. The potential across the gap between the transducer assembly and the storage medium is increased periodically by the sawtooth generator until conduction occurs at a potential level determined by the pressure-distance characteristics of the gap. At each conduction the potential is reset to a low level and allowed to increase again. The detector includes circuitry responsive to any sudden decrease in the level of potential at which conduction occurs, which decrease would indicate a decrease in the width of the gap between the transducer assembly and the rotating storage medium. Since conduction is expected periodically, the detector also advantageously provides a continuing indication that the displacement detector arrangement is in working order. Further, since only changes in conduction potential level are detected rather than the actual potential level, the arrangement is self-adjusting for various transducer assemblies under different operating conditions. There is no need for precise selection of optimum potential level for breakdown of the particular gap.

It is also desirable in many systems to detect movement or displacement of the transducer assembly away from the surface of the storage medium, increasing the gap therebetween. In accordance with a further aspect of the present invention, any sudden change in the conduction potential level whether it be a decrease indicating a decrease in the gap width or an increase in potential indicating an increase in the gap width, is detected to provide a control signal.

Further, abrasive damage to the system may result, even though the transducer assembly is maintained in its proper predetermined positon relative to the surface of the storage medium, if dust or dirt builds up and becomes entrapped in the gap between the transducer assembly and the rotating medium. However, the present invention is operative advantageously to detect such an occurence, since the heat caused by friction due to the entrapped dust helps to ionize the air in the gap and cause conduction at a lower potential level.

A feature of my invention, therefore, relates to a method for detecting displacement of a first conductive object from a predetermined position relative to a second conductive object, which method comprises periodically applying a potential difference between said first and second conductive objects of a magnitude sufficient to cause conduction therebetween and detecting changes in the magnitude of the potential difference necessary to cause conduction.

Another feature of my invention is directed toward displacement detection apparatus for detecting movement of a first conductive object toward a second conductive object comprising a variable potential source connected in circuit with the first and second conductive objects for causing periodic conduction therebetween, and circuitry for detecting conduction and for detecting changes in the potential level at which conduction occurs.

It is a further feature of my invention that apparatus for detecting a change in the width of an air gap between a conductive transducer assembly and a conductive storage medium comprise a circuitry for detecting a change in the ionization or conduction potential of the air gap.

These and other objects and features of the invention will be be better understood upon consideration of the following detailed description and the accompanying drawing in which:

FIG. 1 is a block diagram of an illustrative embodiment of a transducer displacement detector in accordance with the principles of my invention; and FIG. 2 is a graphical representation of several waveforms indicating the operation of the embodiment of FIG. 1.

In the illustrative embodiment shown in FIG. 1 of the drawing, a transducer assembly 11 is positioned adjacent the surface of a magnetic disc storage medium 10. Transducer assembly 11 is positioned by means well known in the art, which forms no part of the present invention, so as to provide a small air gap 15 of predetermined width between transducer assembly 11 and the surface of storage medium 10. As pointed out hereinabove, by way of example, transducer assembly 11 may be positioned by floating it on the film of air generated by rotation of storage medium 10. Thus, for example, transducer assembly 11 may be spring biased away from storage medium 10 while storage medium 10 is at rest and urged toward the surface of storage medium 10 by external air pressure when relative motion exists between transducer assembly 11 and storage medium 10. The external air pressure opposes the spring bias and would cause transducer assembly 11 to contact the surface of rotating storage medium 10 if it were not for the laminar flow of air generated by rotation of storage medium 10 which acts to support transducer assembly 11 at a predetermined gap width from the surface of storage medium 10. In this form of positioning arrangement a usual manner of retracting transducer assembly 11 from its predetermined position comprises merely removing the external air pressure, thereby permitting the spring bias to retract transducer assembly 11.

Regardless of the positioning arrangement employed, the small air gap 15 between transducer assembly 11 and the surface of storage medium 10 must be maintained fairly accurately for optimum peformance of the storage system. In particular, transducer assembly 11 must not be permitted to contact the surface of storage medium 10 lest it lead to abrasive damage to one or both of assembly 11 and storage medium 10, and thus to possible failure of the storage system. The present invention is directed in the illustrative embodiment toward providing an indication of displacement of transducer assembly 11 from its predetermined position toward the surface of rotating storage medium 10. Responsive thereto, the retraction of transducer assembly 11 may be effected before it and storage medium 10 come into contact. Moreover, as will be described hereinbelow, the retraction of transducer assembly 11 may be effected automatically in the illustrative embodiment, even though transducer assembly 11 is maintained in its predetermined position relative to storage medium 10, if dust or dirt becomes entrapped in air gap 15.

The illustrative embodiment of a transducer displacement detector, in accordance with the principles of the present invention as shown in FIG. 1 of the drawing, basically comprises a source of potential 17 and a detector 19 connected in circuit with transducer assembly 11 and the surface of storage medium 10. Both the surface of storage medium 10 and transducer assembly 11, or at least a portion of transducer assembly 11 adjacent the surface of storage medium 10, are assumed to be of conducting material. For example, as is known in the art, the surface of storage medium 10 may comprise a nickel cobalt coating, and transducer assembly 11 may comprise one or more transducer heads set in a block of carbon or other conducting material. Alternatively, the surface of transducer assembly 11 adjacent storage medium 10 may be of a conductive coating or include one or more conducting studs therein.

The conducting surface of storage medium 10 is connected to ground potential in any known manner, such as via drive shaft 13 in FIG. 1, and the conducting portion of transducer assembly 11 is connected over lead 18 to potential source 17. If potential source 17 applies a constant potential across gap 15 of sufficient magnitude to cause conduction in the circuit only when the width of gap 15 is substantially narrowed from its normal predetermined operating width, then such decrease in the width of gap 15 may be detected readily by conduction detector 40. However, if a constant potential is applied across gap 15, the potential level must be selected carefully with respect to the particular transducer assembly, the normal predetermined gap 15, and the system operating conditions. Further, no indication is available that the system is in working order, nor is any indication provided to indicate an increase in the width of gap 15 from its predetermined width.

Thus, in accordance with an aspect of the present invention, potential source 17 in the illustrative embodiment in the drawing comprises a variable potential source, such as a sawtooth potential generator. The maximum output level of variable potential source 17 is greater than the normal conduction potential level of gap 15, that is, the potential level necessary to cause conduction across gap 15 when transducer assembly 11 is positioned at its normal predetermined operating distance from the surface of storage medium 10. The minimum output potential level of variable potential source 17 is substantially less than the normal conduction potential level of gap 15, and is assumed herein to be zero potential level.

The operation of variable potential source 17 is controlled in part by detector 19, the input of which is connected to lead 18 over lead 25 and one output of which is connected over lead 35 to variable potential source 17. Detector 19 comprises conduction detector 40, potential level change detector 45, monopulser 50, and AND gate 70. Conduction detector 40 may comprise a differentiation circuit or other known circuitry for detecting conduction across air gap 15 in the circuit including transducer assembly 11 and storage medium 10. Potential level change detector 45 comprises an arrangement for comparing the potential level at which successive periodic conductions occur across gap 15. By way of example, change detector 45 may comprise a pair of capacitors 20 and 30 and suitable switching circuitry, such as binary counter 38 and relay RA for alternately registering the successive conduction potential levels on capacitors 20 and 30, respectively. Difference amplifier 34 connected to capacitors 20 and 30 provides an indication on lead 46 of any change in the potential level at which successive periodic conductions occur. Lead 46 is connected to AND gate 70 which is enabled by a strobe pulse from monopulser 50 upon detection of each successive conduction across gap 15, except the first such conduction which occurs when the system is being placed in operation. The output of AND gate 70 is connected over lead 72 to utilization circuit 80 which may include suitable known alarm indication circuitry and circuitry for effecting retraction or repositioning of transducer assembly 11.

The operation of the illustrative embodiment in FIG. 1 will now be described with reference to the waveforms shown in FIG. 2, which depict the potential appearing on capacitors 20 and 30 and the stroke pulse output of monopulser 50. For the purposes of illustration and to facilitate description, variable potential source 17 is assumed herein to comprise a sawtooth potential generator, the output of which on lead 18 increases from its minimum output potential level toward its maximum output potential level at a predetermined rate until it is reset to its minimum potential level by a control signal on lead 35. At time $t_0$ in FIG. 2, it is assumed that the storage system has been placed in operation with transducer assembly 11 positioned from storage medium 10 by air gap 15 of predetermined width and that operation of the transducer displacement detector is initiated. Capacitors 20 and 30 are initially uncharged, relay RA is in a deenergized state and flip-flop 54 is reset. The potential level across air gap 15 at which conduction occurs when gap 15 is of predetermined width is assumed to be potential level $V_0$ in FIG. 2, which is referred to herein as the normal conduction potential level of air gap 15. However, as will be apparent from the following description, the particular magnitude of normal conduction potential level $V_0$ of gap 15 is of no consequence to the operation of the illustrative embodiment of FIG. 1.

The increasing output potential level on lead 18 from variable potential source 17 is applied over lead 25, lead 44, through the break portion of transfer contact 1 of relay RA, and through resistor 21 to capacitor 20. At time $t_1$ in FIG. 2, the potential level applied over lead 18 across air gap 15 reaches potential level $V_0$, the normal conduction potential level of gap 15. The air in gap 15 is thus ionized at times $t_1$ and conduction thereacross occurs. Conduction across gap 15 is detected by conduction detector 40 which provides a conduction signal on lead 43 over lead 35 to reset variable potential source 17 to its minimum output potential level. The conduction signal on lead 43 is also applied to the input of binary counter 38 and to AND gate 58. Inasmuch as AND gate 58 is disabled at time $t_1$ by the reset condition of flip-flop 54, monopulser 50 is not energized by the initial conduction signal on lead 43 from conduction detector 40. Therefore, no strobe pulse is generated by monopulser 50 at time $t_1$.

Binary counter 38 is switched to its one state by the conduction signal on lead 43, the output thereof on lead 39 energizing relay RA to operate its transfer contact 1. The operation of transfer contact 1 of relay RA, via the break portion thereof, disconnects capacitor 20 from lead 18 and, via the make portion thereof, connects capacitor 30 to lead 18. The potential level registered on capacitor 20 at time $t_1$ is substantially equal to potential level $V_0$ and is retained on capacitor 20 for subsequent comparison purposes until the break portion of transfer contact 1 of relay RA is released. The output of binary counter 38 on lead 39 is also applied through delay 41 to set flip-flop 54, delay 41 being sufficient to ensure the subsidence of the initial conduction signal on lead 43. The set output of flip-flop 54 on lead 56 enables AND gate 58 to direct all subsequent conduction signals on lead 43 through gate 58 to monopulser 50. Thus, responsive to all subsequent conduction signals on lead 43, monopulser 50 generates corresponding strobe pulses on lead 55, as shown in FIG. 2.

The output of variable potential source 17 on lead 18, upon source 17 being reset to its minimum output potential level at time $t_1$, again increases toward the maximum output potential level until conduction occurs a second time across air gap 15. This is shown as time $t_2$ in FIG. 2. The increasing potential level on lead 18 is applied over leads 25 and 44, through the make portion of transfer contact 1 of relay RA, and through resistor 31 to capacitor 30. Assuming that air gap 15 has been maintained at its predetermined width at time $t_2$, therefore, conduction occurs across air gap 15 at its normal conduction potential level $V_0$, which level is registered on capacitor 30. Responsive to conduction across gap 15, conduction detector 40 provides a conduction signal on lead 43 through AND gate 58, enabled by the set condition of flip-flop 54, to energize monopulser 50. Monopulser 50 generates a strobe pulse on lead 55, as shown in FIG. 2 at time $t_2$, enabling AND gate 70. Enabled gate 70 directs any conduction potential level change indication therethrough over lead 72 to utilization circuit 80. However, since it was assumed that air gap 15 was maintained at its predetermined width at times $t_1$ and $t_2$, the potential level appearing on capacitors 20 and 30 are substantially the same and no level change indication is provided on lead 46 by difference amplifier 34.

The signal on lead 43 from conduction detector 40 also resets variable potential source 17 and switches binary counter 38 to its zero state, de-energizing relay RA. Release of the make portion of transfer contact 1 of relay RA disconnects capacitor 30 from lead 18. The break portion of transfer contact 1 of relay RA connects capacitor 20 again to lead 18, and thus to the output of variable potential source 17, over a path through resistor 21. Since variable potential source 17 is reset to a low output potential level at this time, capacitor 20 discharges quickly over the above path through resistor 21 toward potential source 17 until it reaches the increasing potential level on lead 18. This is shown as time $t_3$ in FIG. 2. At this point the potential level on lead 18 continues to increase, increasing again the potential level registered on capacitor 20 until conduction across gap 15 occurs. This occurs, for example, at time $t_4$ in FIG. 2 if air gap 15 is maintained at its predetermined width, such that conduction occurs across gap 15 at its normal conduction potential level $V_0$.

The operation of the illustrative transducer displacement detector embodiment in FIG. 1 continues in the manner described above, variable potential source 17 causing periodic conductions across gap 15 which are detected by conduction detector 40. The potential levels at which successive conductions occur are registered alternately on capacitors 20 and 30. Assuming that the predetermined width of gap 15 is maintained between transducer assembly 11 and storage medium 10, each successive conduction across gap 15 occurs at substantially the same potential level, namely the normal conduction potential level $V_0$ of gap 15. Therefore, no output control signal appears on lead 72.

Assume, however, that at some point between time $t_5$ and time $t_6$ in FIG. 2, transducer assembly 11 is displaced from its predetermined position toward the surface of storage medium 10. As transducer assembly 11 moves toward the surface of storage medium 10, decreasing the width of gap 15, the conduction potential level of gap 15 decreases to a new level, such as potential level $V_1$ in FIG. 2. As the potential level applied to lead 18 by variable potential source 17 increases toward potential level $V_1$ it is registered on one of capacitors 20 and 30, illustratively shown in FIG. 2 as capacitor 20. When the potential level on lead 18 and thus across gap 15 reaches potential level $V_1$, conduction across gap 15 occurs and is detected by conduction detector 40 to reset variable potential source 17, to energize relay RA through binary counter 38, and to energize monopulser 50 through AND gate 58.

At time $t_6$ in FIG. 2, therefore, the potential level registered on capacitor 20 corresponds to potential level $V_1$. The potential level registered on capacitor 30 from the immediately preceding conduction across gap 15 at time $t_5$ is substantially equal to potential level $V_0$. Accordingly, difference amplifier 34 provides a control signal on lead 46 indicative of the change in conduction potential level, which signal is directed through AND gate 70, enabled by the strobe pulse on lead 55 from monopulser 50, over lead 72 to utilization circuit 80. Responsive to the control signal on lead 72, utilization circuit 80 initiates suitable protective or corrective action, such as retracting transducer assembly 11 before it contacts the surface of storage medium 10.

As mentioned above, abrasive damage to transducer assembly 11 or to storage medium 10 may result even though transducer assembly 11 is maintained in its proper predetermined position relative to the surface of storage medium 10 if dust or dirt becomes entrapped in air gap 15. The present invention is operative advantageously to detect such an occurrence, however, since friction due to the entrapped dust heats up the air in gap 15 and thus lowers the conduction potential level of gap 15. The effect, therefore, from the standpoint of the illustrative transducer displacement detector in FIG. 1, is the same as if the width of gap 15 were decreased from its normal predetermined width, and consequently a control signal is provided by detector 19 on lead 72.

Although the above description assumed a change in the width of air gap 15 in the sense of a decrease in gap 15 from its predetermined width, it will be apparent that an increase in the width of gap 15 will also provide an output signal on lead 72. If transducer assembly 11 is displaced away from the surface of storage medium 10 increasing the width of gap 15, the conduction potential of gap 15 increases accordingly. Any change in conduction potential level, whether it be a decrease or an increase, is detected by potential level change detector 45 to provide a control signal through AND gate 70 on lead 72.

It may be noted further that a continuing indication that the transducer displacement detector is in working order may be provided readily by monitoring the output of conduction detector 40 or monopulser 50. Since conduction is expected periodically, this may be accomplished quite simply, for example, by connecting failure timer 90 over lead 52 to the output of monopulser 50. The absence of successive strobe pulses from monopulser 50 within a predetermined time interval greater than the time interval between times $t_2$ and $t_4$ in FIG. 2 energizes failure timer 90 to provide a suitable failure indication.

It is to be understood that the above-described arrangements are but illustrative of the application of the principles of applicant's invention. Numerous other arrangements may be devised by those skilled in the art without departing from the spirit and scope of the invention.

What is claimed is:

1. A method for detecting a change in the width of an air gap between a conductive transducer assembly and a conductive storage medium, which method comprises periodically applying a potential difference between said transducer assembly and said storage medium of a magnitude sufficient to cause conduction across said air gap, and detecting changes in the magnitude of the potential difference between said transducer assembly and said storage medium necessary to cause conduction across said air gap.

2. A method for detecting a change in the width of an air gap between a conductive transducer assembly and a conductive storage medium, which method comprises periodically applying an increasing potential difference between said transducer assembly and said storage medium until conduction across said air gap occurs, comparing the magnitude of the potential difference at which each successive conduction across said gap occurs with the magnitude of the potential difference at which the immediately preceding conduction across said gap occurred, and detecting a change in the magnitude of the potential difference between said transducer assembly and said storage medium at which successive conductions across said air gap occur.

3. A method for detecting a change in the width of an air gap between a transducer assembly and a storage medium, which method comprises applying an increasing potential difference across said air gap between said transducer assembly and said storage medium until conduction occurs, detecting each conduction across said air gap, reducing said potential difference across said air gap between said transducer assembly and said storage medium upon detection of conduction to a magnitude insufficient to continue said conduction across said air gap and thereafter applying an increasing potential difference again across said air gap until conduction occurs, temporarily registering an indication of the magnitude of the potential difference at which each conduction across said air gap occurs, comparing the magnitude of potential difference at which each successive conduction occurs across said air gap with the registered magnitude of potential difference at which the immediately preceding conduction across said air gap occurred, and utilizing the results of the comparison to provide an indication of a change in the magnitude of potential difference at which said successive conductions across said air gap occur.

4. A method for detecting displacement of a first conductive object from a predetermined position relative to a second conductive object, which method comprises periodically applying a potential difference between said first and said second conductive objects of a magnitude sufficient to cause conduction between said first and said second conductive objects, monitoring each periodic conduction to determine the magnitude of the potential difference between said first and said second conductive objects when conduction therebetween is effected, and detecting variations in the magnitude of the potential difference between said first and said second conductive objects at which successive periodic conductions between said first and said second conductive objects are effected.

5. A transducer displacement detector for detecting a change in the width of an air gap between a storage medium and a transducer assembly positioned adjacent thereto comprising, means for periodically determining the conduction potential of said air gap between said transducer assembly and said storage medium, and means for detecting a change in the magnitude of the conduction potential of said air gap.

6. A transducer displacement detector for detecting a change in the width of an air gap between a storage medium and a transducer assembly positioned adjacent thereto comprising, means for periodically determining the conduction potential of said air gap between said transducer and said storage medium, first and second register means, means for directing the periodic conduction potential determinations alternately to said first and second register means, and means for comparing the conduction potential determinations registered in said first and second register means to detect a change in the magnitude of the conduction potential of said air gap.

7. A transducer displacement detector in accordance with claim 6 wherein said means for detecting a change in the magnitude of conduction potential of said air gap comprises first and second register means, means for registering the periodic conduction potential determinations alternately in said first and said second register means, and means for comparing the conduction potential determinations registered in said first and said second register means.

8. A transducer displacement detector for detecting a change in the width of an air gap between a storage medium and a transducer assembly positioned adjacent thereto comprising, first conductive means associated with said storage medium, second conductive means associated with said transducer assembly, variable potential means, means for connecting said variable potential means in circuit with said first and said second conductive means, means for periodically varying the potential of said variable potential means until conduction occurs across said air gap between said first and second conductive means, means for determining the potential of said variable potential source at the time each conduction occurs, and means including said determining means for detecting a change in the magnitude of the conduction potential of said air gap.

9. Displacement detection apparatus for detecting displacement of a first conductive object toward or away from a second conductive object comprising, a variable potential source, means connecting said variable potential source in circuit with said first and second conductive objects, means for controlling the potential of said variable potential source to cause periodic conduction between said first and second conductive objects, said controlling means including means for detecting conduction between said first and second conductive objects, and means for detecting changes in the potential of said variable potential source at which successive periodic conductions between said first and second conductive objects occur.

10. In a system including a moving storage medium having a surface of conducting material and a transducer assembly positioned adjacent the surface of said storage medium so as to define a gap of predetermined width between said transducer assembly and said storage medium surface, means for detecting a change in said predetermined gap width comprising, conductive means associated with at least a portion of said transducer assembly adjacent the surface of said storage medium across said gap, a variable potential source having a maximum output potential level greater than the potential level necessary to cause conduction across said predetermined gap width and having a minimum output potential level insufficient to cause conduction across said predetermined gap width, means connecting said variable potential source in circuit with said conductive means and said surface of said storage medium, means for periodically varying the output potential level of said variable potential source to determine the output potential level at which conduction across said gap occurs, and means connected in circuit with said variable potential source for detecting changes in the output potential level thereof at which conduction across said gap occurs.

11. In a system in accordance with claim 10, means for detecting a change in said predetermined gap width wherein said means for periodically varying the output potential level of said variable potential source comprises conduction detector means responsive to detection of conduction across said gap for producing a quick decrease in the output potential level of said variable potential source toward said minimum output potential level thereof, the output potential level of said variable potential source thereafter increasing toward said maximum output potential level at a rate slow in relation to said previous decrease in output potential level.

12. In a system in accordance with claim 11, means for detecting a change in said predetermined gap width wherein said potential level change detecting means comprises first and second conduction potential level determination means, switching means responsive to said conduction detector means for alternately connecting individual ones of said first and second conduction potential level determination means in circuit with said variable potential source, said individual conduction potential level determination means registering the potential level at which conduction across said gap occurs when said individual determination means is connected to said variable potential source, and means responsive to said conduction detector means for comparing the conduction potential level determinations registered in said first and second conduction potential level determination means.

References Cited

UNITED STATES PATENTS

| | | | |
|---|---|---|---|
| 2,575,492 | 11/1951 | Dittmann | 324—61 |
| 2,708,693 | 5/1955 | Hendrickson | 178—100.2 |
| 2,982,822 | 5/1961 | Bacon | 179—100.2 |

BERNARD KONICK, *Primary Examiner.*

V. P. CANNEY, *Assistant Examiner.*